O. A. HANFORD.
GLASS WORKING MACHINE.
APPLICATION FILED NOV. 11, 1914.
1,254,904.
Patented Jan. 29, 1918.
7 SHEETS—SHEET 5.
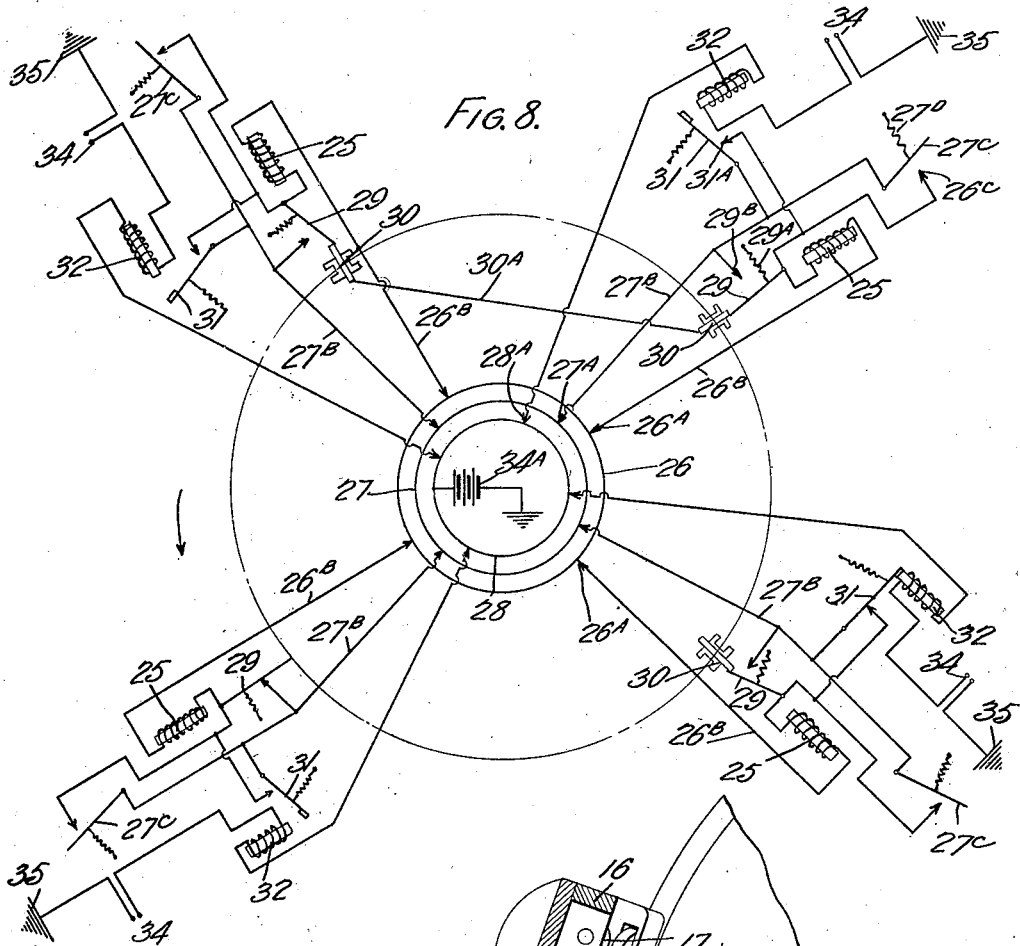
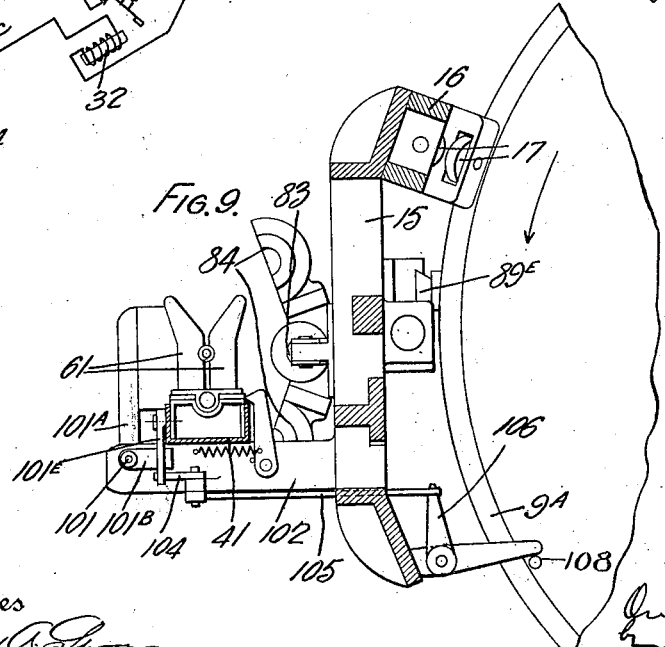
Witnesses
Inventor
Attorney O. A. HANFORD.
GLASS WORKING MACHINE.
APPLICATION FILED NOV. 11, 1914.
1,254,904.
Patented Jan. 29, 1918.
7 SHEETS—SHEET 6.
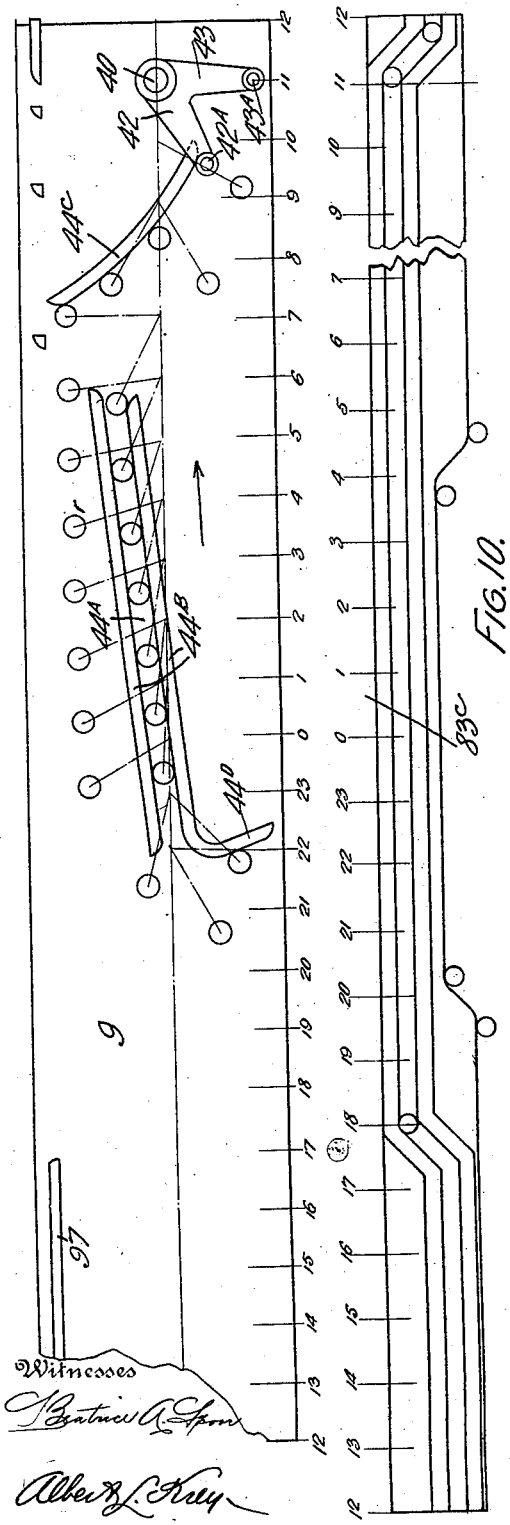
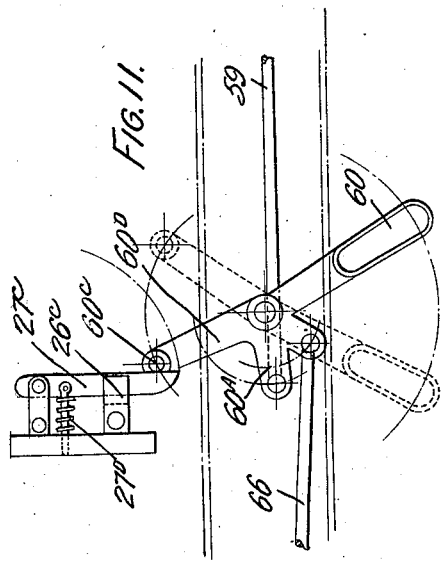

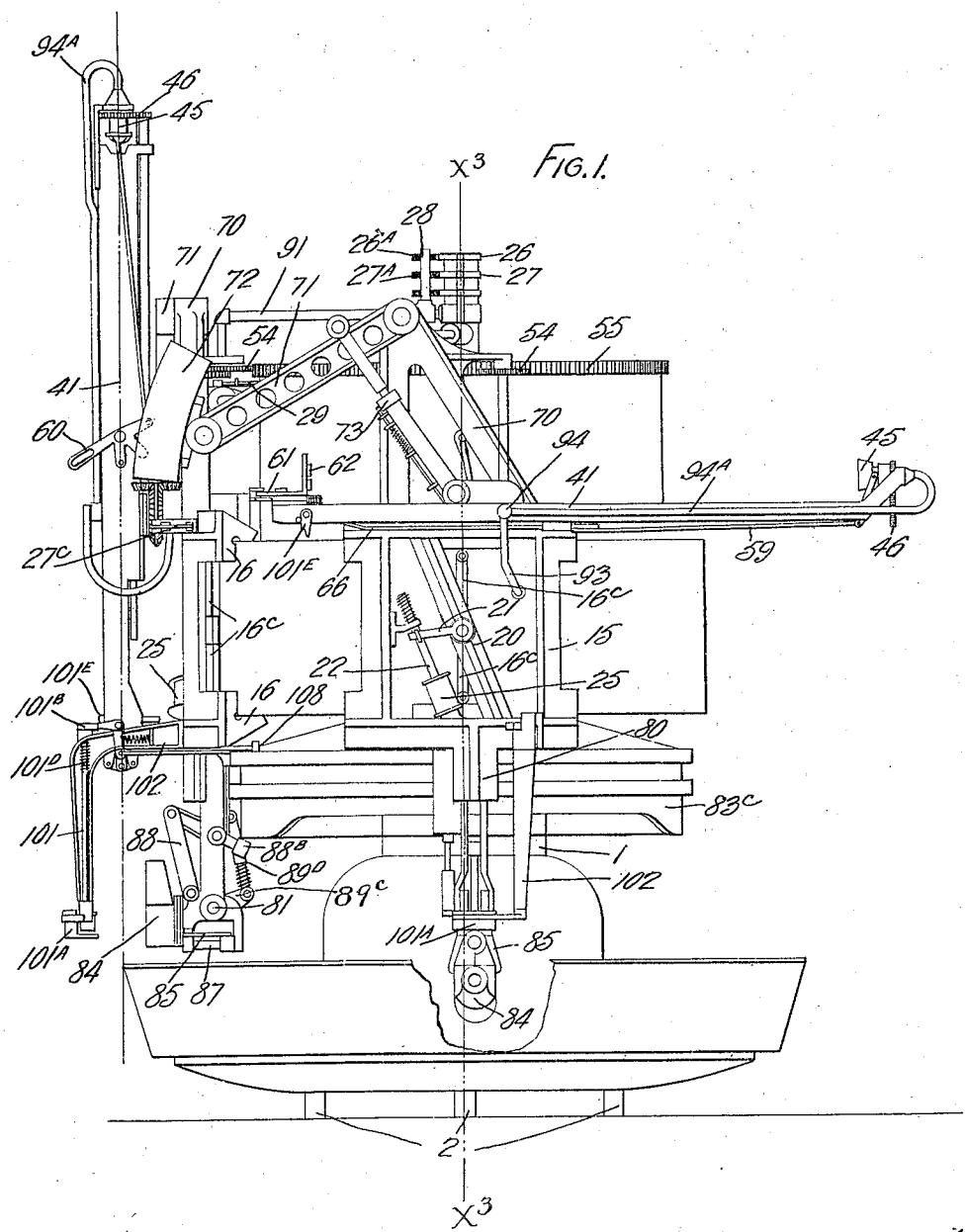

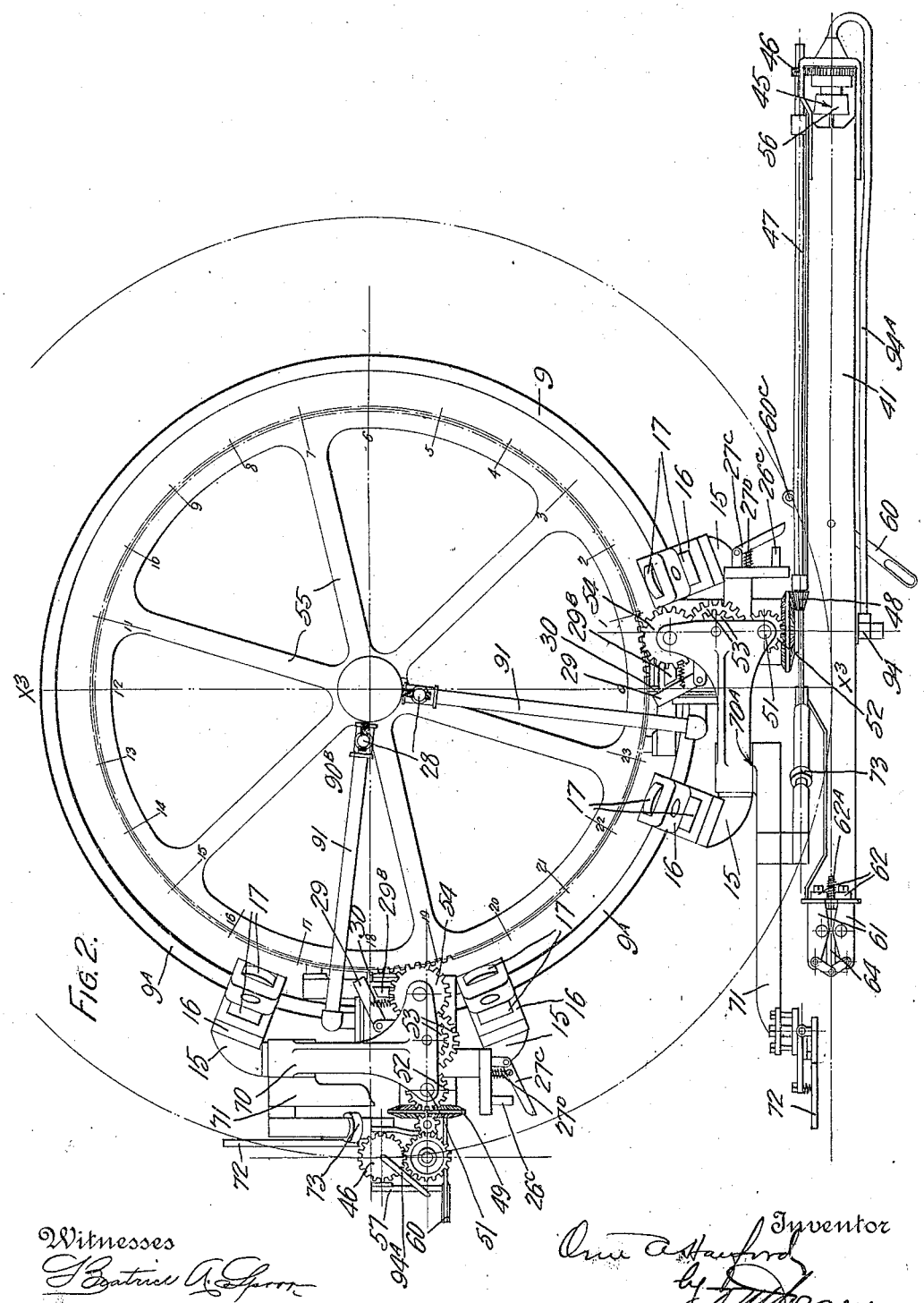

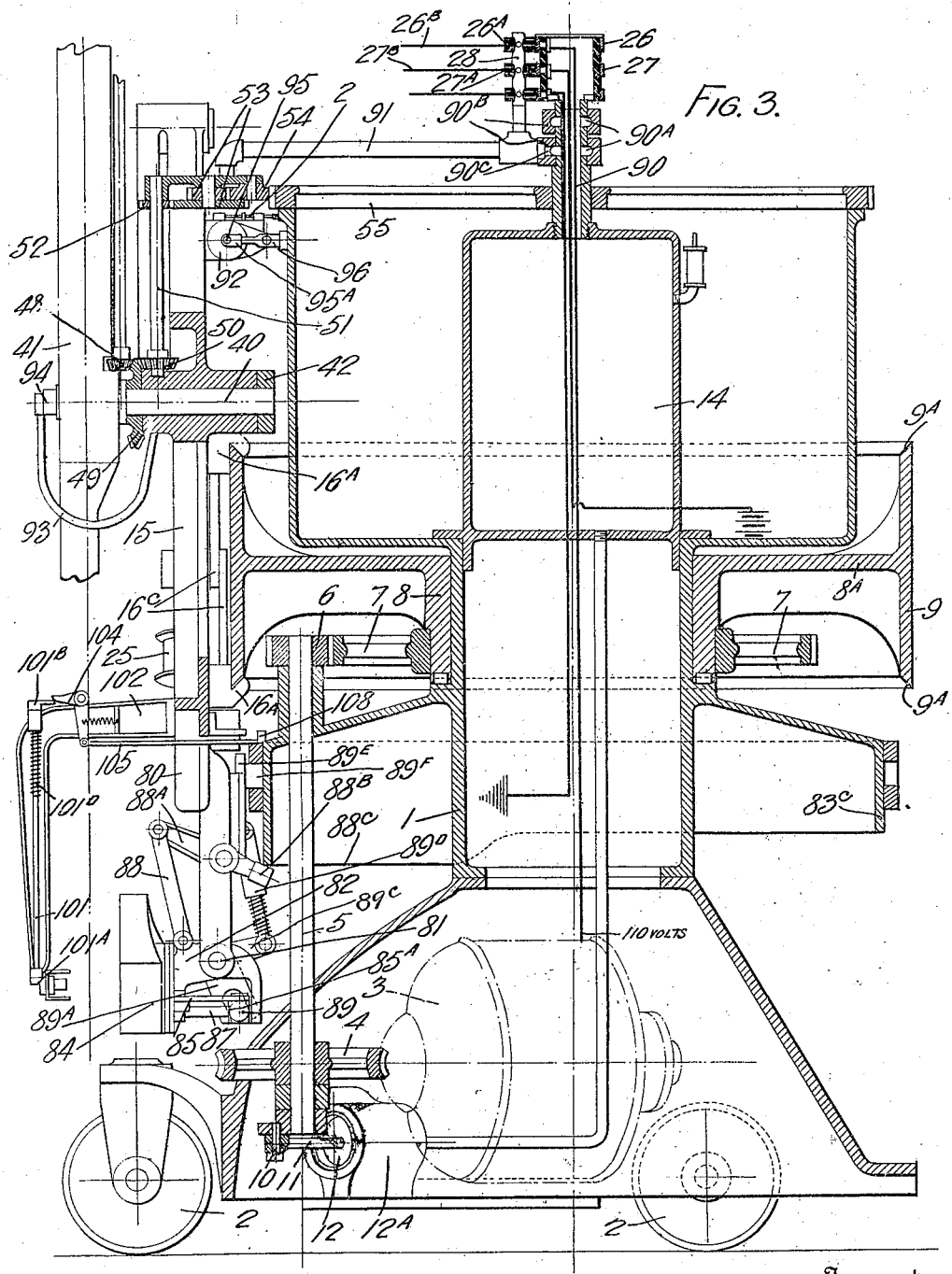

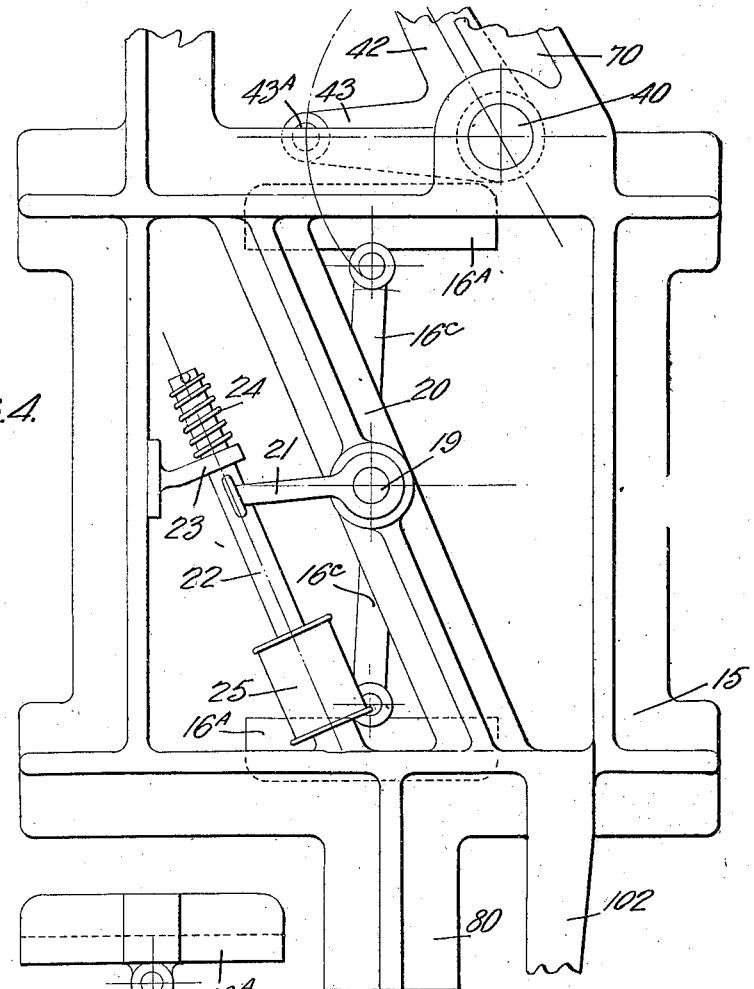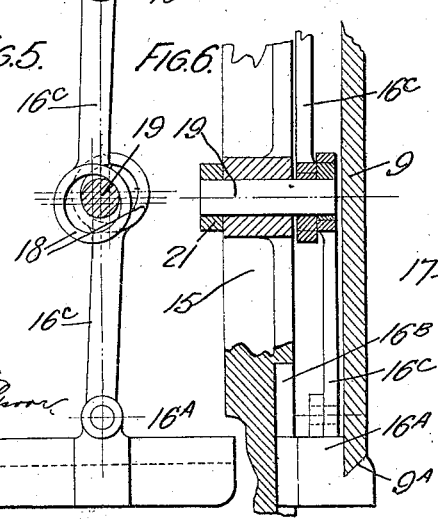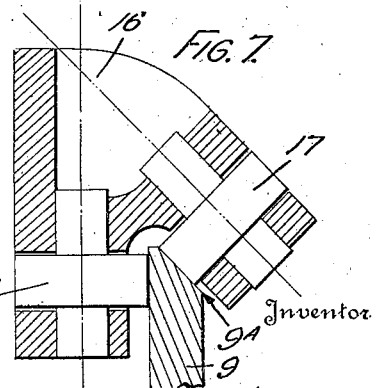

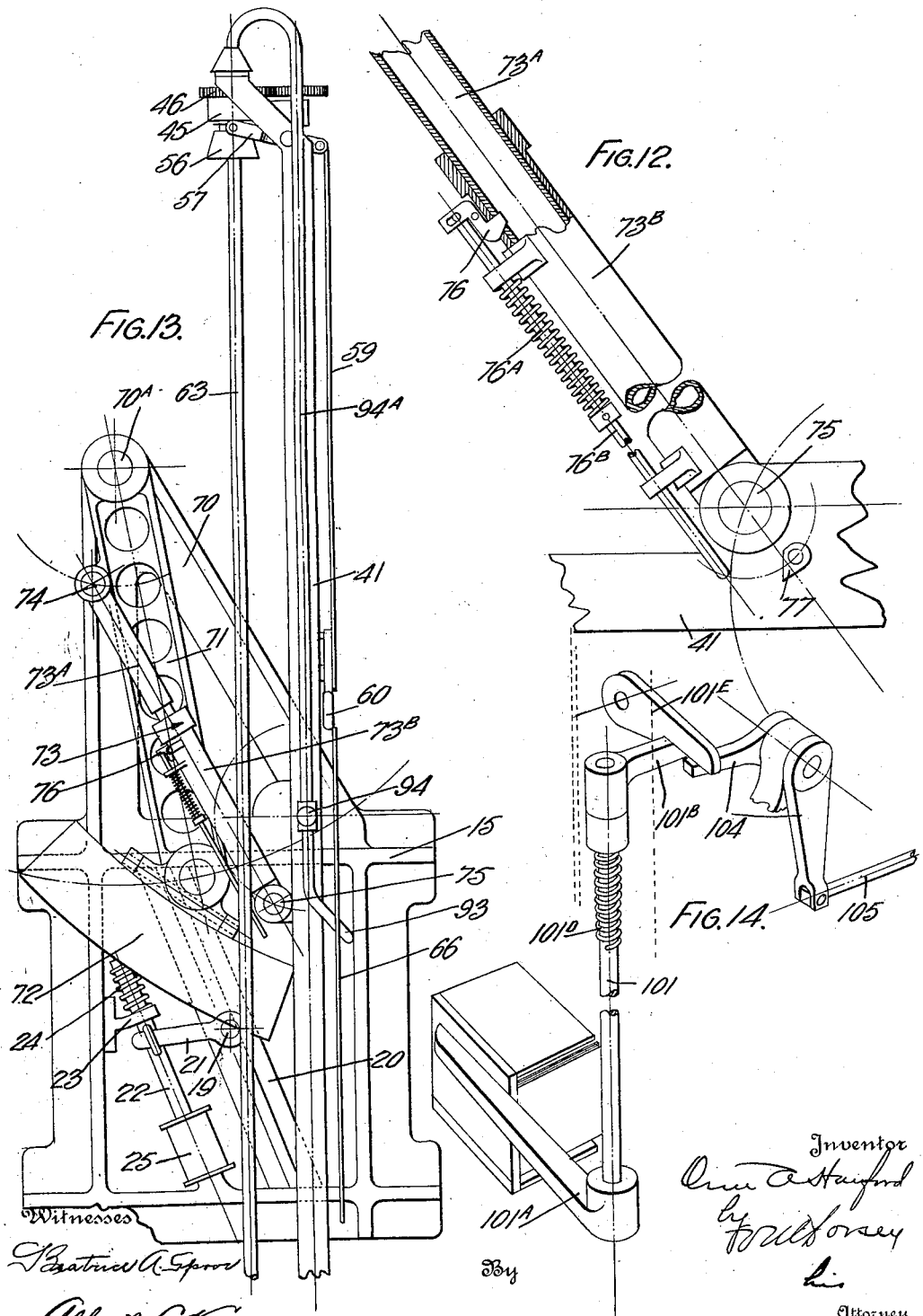

UNITED STATES PATENT OFFICE.

ORI. A. HANFORD, OF ORANGE, NEW JERSEY, ASSIGNOR TO EMPIRE MACHINE COMPANY, A CORPORATION OF MAINE.

GLASS-WORKING MACHINE.

1,254,904.  Specification of Letters Patent.  Patented Jan. 29, 1918.

Application filed November 11, 1914. Serial No. 871,562.

*To all whom it may concern:*

Be it known that I, ORIN A. HANFORD, a citizen of the United States of America, and a resident of Orange, New Jersey, have invented certain new and useful Improvements in Glass-Working Machines, of which the following is a specification.

My invention relates to certain improvements in glass-working machinery, and especially to that type thereof adapted for the production of finer grades of thin hollow glassware such as lamp bulbs. For this purpose it comprises a plurality of glass-working units movable in a closed path independently of each other, with means for arresting each unit independently of every other unit at a plurality of definite points in such path, and inasmuch as one of the "arrest" positions is that at which the unit is loaded, it further comprises means, which, when a unit moves from such position, another unit is automatically brought into such position.

It also comprises means, controlled by the elongation of the gather for automatically causing each unit to move forward from another of such arrest positions, such last-named position being one to permit elongation of the gather.

It further involves improvements in the glass-working units themselves, and in the construction, combination and arrangement of the several parts of which it is composed, as will be hereinafter more fully described and claimed.

Referring to the accompanying drawings, in which corresponding parts are designated by corresponding marks of reference:

Figure 1 is a front elevation of the machine constructed in accordance with the invention, looking at the side of the machine corresponding to loading position.

Fig. 2 is a plan view thereof.

Fig. 3 is a vertical central section on line $x^3-x^3$ of Figs. 1 and 2, showing the traveling unit, which in the preceding figures is at loading position, as in elongation position.

Fig. 4 is a fragmental detail of a unit carrier frame.

Fig. 5 is a detail elevation of the unit clutch.

Fig. 6 is a fragmental view therethrough.

Fig. 7 is a detail of one of the roller bearings for the unit carrying frames.

Fig. 8 is a diagram of the electrical connections.

Fig. 9 is a fragmental sectional view, partly in plan, taken through a unit carrier.

Fig. 10 is a development of the blow-pipe swinging, air and mold operating cams.

Fig. 11 is a detail of a main starting lever, showing it in coöperative relation with the corresponding main starting switch.

Fig. 12 is a detail partly in section of the telescopic brace for the marverer.

Fig. 13 is an enlarged detail of a unit frame and certain parts carried thereon.

Fig. 14 is a corresponding view of the thermostatic controller.

The machine is erected upon, and around a central column 1, which may be made in one or more pieces, and which, by preference, is mounted upon carrying wheels 2, the column being, by preference, circular in horizontal cross section. Within the base of the column is mounted a suitable, and by preference an electric motor, 3, which drives through the reducing worm gear 4, a vertical shaft 5, the upper end of which has fast thereon a pinion 6 meshing with a gear 7 keyed on the hub 8 of a driving drum 9, the hub 8, being sleeved upon a circular bearing on the vertical central column. The shaft 5 has upon its base a wrist pin 10 driving through the pitman 11, the piston head 12 of an air pump 12ª, through which air is delivered under pressure to an air chamber 14 formed in the top of the central column.

The driving drum 9 is connected to the hub 8 by the web 8ª, and the annular wall of the drum extends both above and below such web, being beveled to a sharp edge upon its upper and lower outer corners as at 9ª.

Each of the glass-working units comprises a main carrier formed in part of a rectangular hollow frame 15, which has upon its inner face at each of its corners a mounting 16 for rollers 17, which rollers bear upon the beveled top and bottom faces of the drum 9 and on the periphery of the drum adjacent thereto according to whether such rollers are at the top or bottom of their respective frames. The drum thus serves as a support for the carrying frames 15, which are adapted to be caused to move therewith, but which by virtue of the roller bearing may remain stationary while the drum revolves. For the purpose of connecting the frames 15 to the drum each frame has attached thereto a clutch comprising the upper and lower shoes 16ª working in vertical slots 16ᵇ in the upper and lower members of the frame, and connected to the upper and lower ends respectively of rods 16ᶜ, the inner ends of which surround eccentrics 18 mounted on the inner end of a horizontal shaft, 19, pivoted in a diagonal 20 of corresponding carrying frame. The outer end of each shaft 19 has keyed thereon an arm 21, pivoted to a rod 22 working in suitable guides 23 in the carrying frame, and adapted to be pulled by a spring 24 in such direction that the clutch shoes are normally loose upon the drum. The rod 22 is pulled in the reverse direction, and against the tension of the spring 24, by a solenoid 25 so that when such solenoid is energized, the shaft 19 is partly rotated and the clutch shoes drawn upon the edges of the drum, thereby locking the carrier frame to such drum and causing it to partake of the movement of the drum.

From the above it will be seen that whether or not a driving connection will exist between drum and each individual carrier, will depend upon whether or not the solenoid on that particular carrier is energized.

The specific embodiment of the machine here shown is a machine having three definite positions which may be designated stoppage positions at which the travel of the carriers is automatically arrested, one of these positions being at loading, the second being for elongation and the third being a storage position, but only two units are shown for simplicity for the mechanical figures. Additional units, however, may be added and by preference the number of units is greater than the number of stoppage points, (as is shown in the diagram, Fig. 8), so that there are intervals at which three of the units are at rest in the desired positions, while other unit or units is or are in travel. This is done for the purpose of providing a reserve unit or units to move into the loading position immediately upon the preceding unit moving from such position. With such a machine, the wiring for the several solenoids is as follows:—

Mounted at the extreme top of the machine are two contact rings 26 and 27, having a different potential created thereon. For this purpose, I would suggest a difference of 110 volts, although this may be varied. Brushes 26ª and 27ª carried by a standard 28 moving with each frame, contact with the rings 26 and 27, respectively, and leads 26ᵇ and 27ᵇ lead from such brushes the leads 26ᵇ and 27ᵇ for each frame being adapted to be connected to each other through a main manually controlled starting switch 27ᶜ, a coöperating contact 26ᶜ, both mounted on the frame and the solenoid 25 operating the clutch of such frame. A contact arm 29 is connected with the described circuit on each frame between the solenoid 25 and the contact 26ᶜ, and is normally drawn by means of a spring 29ª toward a contact point 29ᵇ, connected to such circuit between the switch lever 27ᶜ, and the brush 27ª. Symmetrically projecting from the enlarged head of the main column in respect to the several desired stopping points, and insulated therefrom are studs 30, which, when any unit has reached a desired stopping point, is adapted to be struck by the switch lever 29 and to lift the same from off its coöperating contact 29ᵇ. The exact position of all the studs is such that when any unit adjacent to such stud is at such stopping position such stud by contacting with the automatic switch of such unit breaks contact between such switch and its contact point 29ᵇ. Thus presuming a unit to be in one of the stopping positions and presuming that the main switches 27ᶜ are not in contact with their respective contact points 26ᶜ, all of the solenoids 25 will be deënergized, and all the units will be released from the driving drum. Any unit can now be put in motion by closing the circuit at its main switch 27ᶜ, thus completing the circuit through its clutch solenoid and engaging such unit with the drum by which it will be moved. As soon as such unit in this movement has moved sufficiently in respect to the corresponding stud 30, the automatic switch 29 on such unit will trip over the stud and be pulled back upon the contact 29ᵇ, thus completing the circuit through the solenoid independently of the main switch, which may be then released. The clutch on such unit is now held closed on the driving drum by virtue of the circuit created through the automatic switch 29 and contact point 29ᵇ until such unit is moved to the next stopping position, when the stud 30 at such position will break the circuit between the switch lever 29 and the contact point 29ᵇ and as the main switch has been released by this time and has been withdrawn from the contact point 26ᶜ by means of its spring 27ᵈ the circuit through the energizing solenoid will be broken and the driving connection between the drum and the unit will also be thus broken, permitting such unit to come to rest at the next stopping point.

As it is desired that the unit in storage be automatically caused to move to loading position by the movement of the preceding unit from such position, the contact studs 30 adjacent to the loading and reserve positions are connected together by the wire 30ª. Thus the closing of the main switch 27ᶜ of the unit in loading position not only completes the circuit through the solenoid of such unit to start its movement, but also completes a circuit through the solenoid of the unit in loading position through the automatic switch 29 of such unit, the stud 30 of the storage position, the wire 30ª, the stud 30 of the loading position, and the main switch 27° of the unit in loading position, whereby the clutch solenoid of the unit in the storage position will also be energized and such unit will be caused to move from such position and, until its automatic switch 29 escapes the stud 30 of the reserve position and falls upon its contact 29ᵇ, thus causing the unit in storage position to move forward to loading position where it will be arrested as before described. In order to assure that the unit at storage or reserve position is moved sufficiently far for the tripping of its contact lever 29 from the storage stud, the stud at storage position may be made shorter than the stud at loading position.

It has been stated that each unit will, when its solenoid is energized move forward to the next position. I have in the accompanying diagrammatic drawing shown four units, although there are but three stop positions. The time of the machine, however, is such that at the normal rate of working and with the elongating position diametrically opposite the loading position the fourth unit will be moving from loading position to elongating position while the blowing unit is arrested and will not run up upon and collide with the unit in the elongating position, but will be slightly in the rear thereof, and thus there will be a unit in or adjacent to elongating position substantially all the time.

Inasmuch as it is sometimes desirable that the movement of each unit from the elongation position be automatic after the proper period of arrest there, I provide a controllable shunt around the main switch 27° and the automatic switch 29, such shunt comprising a switch arm 31 connected to the wire 27ᵇ, and the contact point 31ª connected with the wire 26ᵇ between the clutch solenoid and the contact point 26°. The arm 31 forms the armature of an electro-magnet 32, the energizing wire of which is connected through an automatic contact maker 34 between a ground connection 35 to the frame of the machine and a contact brush 28ª traveling on a contact ring 28 located below the rings 26 and 27 and similar thereto, such contact ring 28 being connected to one side of the battery 34ª, the opposite side of which is also grounded on the frame. Under these conditions, when the automatic switch 34 is closed the electromagnet 32 will be energized and a circuit closed through the solenoid 25 of such unit, whereby such solenoid will be energized and the unit clutch operated to give the initial movement to the unit from the elongation position, after which the circuit through the solenoid will be made through the automatic switch 29 as before described. The closing of the switch 34 is by preference a function of the behavior of the glass and is caused thereby. One type of such contact maker is described and claimed in my prior Patent 1,066,270, dated July 1, 1913, and I will hereinafter describe how such a contact maker may be applied to the machine here described.

The mechanism for working glass as shown in the accompanying drawings is individualized as to each unit, although it is obvious that this is not essential to that broad feature of my invention which is directed to the movement of the units. To illustrate the scope of my invention in this respect, it is noted that it is applicable to the movement of glass working units, which units each contain a part only of the instrumentalities employed in working the glass, other parts being assembled and mounted upon non-traveling parts of the machine with which non-traveling instrumentalities the traveling instrumentalities are brought into coöperation by the movement of the units and are maintained in such coöperative relation when such units are arrested. An example of such a structure is found in the application of Robert W. Canfield filed August 20, 1914, Serial Number 857,705. However, as before stated, in the present application, I have shown each unit as carrying the complete instrumentalities employed in the working of the glass. As shown these instrumentalities are, a marverer, a mold, and a blow-pipe, and means for imparting to these several instrumentalities the desired movements. Inasmuch as the instrumentalities mounted upon each unit are identical the following description, which is of the mechanisms of a single unit, will apply to the other units.

*The blow-pipe carrying mechanism.*

Each unit frame 15 has in its upper horizontal member a bearing for the trunnion 40 mounted on the inner side of a blow-pipe frame 41, the blow-pipe frame being on the outer side of such bearing, and the trunnion having on its inner end two crank arms 42, and 43, each arm carrying a roller 42ª and 43ª, respectively, while the enlarged head of the central column has located upon its periphery, a series of cams, the development of which is shown in Fig. 10. These cams include a run 44ª formed by upper and lower flanges 44ᵇ located at and extending on both sides from a point adjacent to the loading position, and so located that when a unit is in loading position the roller 43ª of such unit will be contained within such run and between the flanges, the blow-pipe frame being horizontal at such time, and that as the unit moves forward from loading position in the direction of the arrow Fig. 10 such roller will be gradually lifted and will move the blow-pipe frame around the bearing of the trunnion, lifting what will be hereinafter called the gather end of the frame. Located beyond the exit end of the runs 44$^a$ is a curved run 44$^c$ formed by a single flange adapted in the further movement of the unit to be struck by the roller 42$^a$ thereof and to depress such roller, thus reversing the direction of movement of the blow-pipe frame around its trunnion bearing. The end of the cam run 44$^c$ is so located that upon the escape of the roller 42$^a$ therefrom, the blow-pipe frame will be substantially vertical with the gather end down, and will remain in this position until the unit carrier has made nearly a complete revolution around the central column when the roller 43$^a$ will by contacting with the depending finger 44$^d$ on the entering end of the bottom flange 44$^b$ be thrown upward to guide such roller into the run 44$^a$ and to restore the blow-pipe frame to its original horizontal position.

The opposite end of the blow-pipe frame to that which has been called the gather end has projecting from the rear side (that is to say, the side from which the unit moves in its travel) a suitable rotatable blow-pipe chuck 45, to which motion may be imparted through the gearing 46 and the shaft 47 extending axially of the blow-pipe frame. The lower end of this shaft has a pinion 48 thereon meshing with a double-faced beveled gear ring 49 sleeved on the trunnion 40 and meshing with a gear 50 mounted on the lower end of a shaft 51 mounted in bearings in the unit frame and having on its upper end a pinion 52 driven through the gearings 53 by a pinion 54 meshing with a stationary gear 55 formed on the enlarged head of the column, so that as the unit travels around such column the blow-pipe chuck will be rotated, while during the intervals that the unit is stationary no rotation of the blow-pipe chuck will take place.

The blow-pipe chuck includes a bell 56 axially sliding in respect to such chuck and adapted to be projected from the inner end of the same by means of one end of a yoke 57 pivoted in the blow-pipe frame and having its other end connected by a rod 59 to one arm 60$^a$ of the operating lever 60. The blow-pipe frame carries on its gather end pivoted levers 61, the inner ends of which project forwardly and rearwardly in respect to the direction of movement of the frame, and each have mounted thereon two rollers 62 adapted to receive the lower end of a removable blow-pipe 63, whose outer end may have been inserted within the bell of the chuck. The rollers are normally held against the blow-pipe to center the latter by means of a spring 62$^a$ acting upon a slide 64 whose outer end is connected by toggles with the outer ends of the levers 61. The slide 64 is moreover connected by the rod 66 with another arm 60$^b$ of the hand lever 60, the arrangement of the point of attachment of the rods 59 and 66 to the arms 60$^a$ and 60$^b$ being such that when the hand lever is thrown in one direction the bell of the blow-pipe chuck is retracted within the chuck and the opposite pairs of rollers 62 separate, while when such lever is moved in the opposite direction the bell of the chuck is projected on the blow-pipe and the rollers 62 allowed to close upon the opposite end of the blow-pipe. The hand lever 60 has a third arm 60$^c$ so located when the blow-pipe frame is horizontal that as the hand lever is turned in the last-named direction, that is to say, in the direction to engage a blow-pipe a pin 60$^e$, on another arm 60$^d$ of such lever will by contacting with the main switch 26$^c$ before referred to, close the latter on the contact 26$^e$.

Inasmuch as the main switch 27$^c$ is mounted on the unit frame and the starting lever is mounted on the blow-pipe frame, the coöperative relation before described between the two will subsist only while the unit carrier is in its normal horizontal position, and as the blow-pipe frame is swung from this position upon the first movement of the unit carrier it follows that this operative connection will be soon destroyed, but not until the unit carrier has moved sufficiently to permit the automatic switch to move off the contacting stud located adjacent to the loading position, so that the further movement of the unit carrier will be under the control of such automatic switch.

*The marverer.*

The unit frame has rising from its upper end a head 70, at the upper end of which is pivoted at 70$^a$ the marverer carrying arm 71, projecting toward the rear side of the unit carrier. The outer end of this arm has thereon an arc-shaped marvering plate 72, which is so situated that its outer surface will be adjacent to the plane of movement of a gather of glass carried on the blow-pipe mounted in the blow-pipe frame when the gather end of such frame is lifted in the manner before described. When so lifted the gather will be rolled along the surface of the marvering plate and marvered, the surface of the plate being properly shaped to permit this. The arm 71 is connected to the blow-pipe frame by means of the telescopic link 73, the upper member 73$^a$ of which is pivoted to such arm at 74, and the lower member 73$^b$ of which is pivoted at its bottom to the blow-pipe frame at 75. Normally the telescopic members are held rigid with one another by means of a catch 76 pivoted in the lower member and engaging the lower end of the upper member, such catch being normally held in this position by a spring 76ª encircling its actuating rod 76ᵇ, the lower end of which terminates adjacent to the pivot 75. Thus as the blow-pipe frame swings up a slight movement will be given to the marverer around its pivot 70ª, but this movement will not interfere with the marvering. As the gather end of the blow-pipe frame completes its upward swing a projection 77 on such blow-pipe frame will strike the lower end of the rod 76ᵇ and release the latch 76 between the two members of the telescopic link, allowing such link to collapse whereupon the marverer 72 will swing downwardly around the pivot 70ª and be withdrawn from the described position. This movement of the marverer will not only remove it away from the marvered glass and avoid subsequent interference between the two, but will also bring the marverer upon the outside of the unit frame, thereby reducing the breadth of the parts carried by such frame and avoiding interference with other units of the machine. The marverer will swing downwardly through a limited distance where it will be arrested by a suitable stop on the unit carrier. The blow-pipe frame after completing the marvering is, as before stated, lowered to a vertical position in which the gather end is down. This movement of the blow-pipe frame in connection with the arrestation of the downward swing of the marverer results in an extension of the telescopic link and a restoration of the parts thereof to their normal position in which they will be locked from collapse by the latch 76. Upon the subsequent upward movement of the gather end of the blow-pipe the marverer will be lifted through these now non-collapsing members and be restored to its normal position.

*The mold mechanism.*

Each unit carrier has depending therefrom a leg 80 in which is mounted the horizontal pivot 81 of a mold carrier 82. Mounted in the mold carrier on a pivot 83 at right angles to the pivot 81 are the two half molds 84. Each half mold is connected by a link 85 to a block 85ª sliding on rods 87, carried by the mold carrier. The mold carrier is connected to the lower end of a link 88 which is pivoted to the forward end of a lever 88ª, pivoted in the leg 80 and having on its rear end a roller 88ᵇ running upon the lower edge of a cam flange 88ᶜ surrounding the central column. This cam is so shaped that at the proper time the roller 88ᵇ will be depressed to throw the mold carrier upon its pivot and to thus raise the mold halves. The blocks 85ª are on opposite ends of a cross-stud 89, which is engaged by the lower and inner end of a crank arm 89ª fast on the pivot shaft 81 mounted in the base of the leg 80 and having keyed thereon crank arm 89ᶜ connected through the compressible member 89ᵈ to a slide 89ᵉ guided in the rear face of the leg 80. This slide has in turn on its rear face a roller 89ᶠ running in a peripheral cam on the flange 83ᶜ, this cam being so shaped that when the mold parts are lowered as before described, they are open and that during a part of the time that they are raised, they are closed. Partially surrounding the base of the central column and located at the loading position is a water box, adapted to contain water and in which the mold halves when lowered are submerged. Thus the actuation of the mold parts, like the rotation of the blow-pipe is a function of the revolution of the unit carrier around the central column.

*Air.*

Mounted on the head of the central column and arising from the air reservoir 14 formed therein is a hollow standard 90 provided with ports 90ª arranged in horizontal rows therearound, the number of said ports being equal to the number of the unit carriers. The standard is surrounded opposite each row by a collar 90ᵇ having an annular groove 90ᶜ in its interior, communicating with the air tank through the corresponding ports, and from each collar extends an air pipe 91 which is connected, through an air valve 92 mounted on the corresponding carrier, and through the flexible connection 93, to one member of a rotating air joint 94, located axially in respect to the pivotal mounting of the corresponding blow-pipe frame. From the opposite member of this connection, which is fast upon the blow-pipe frame, an air pipe 94ª leads to the blow-pipe chuck before referred to. The air valve 92 has a rotating stem 95, on which is keyed a cross-head 95ª engaged by a lever 96 pivoted on the unit carrier and having its opposite end guided by a cam 97 mounted upon the enlarged head of the central column, whereby in the rotation of the unit around the central standard this valve will be actuated at proper times and in proper amounts.

With the above described embodiment of the invention and with the parts all in their normal position, that is to say, with a unit carrier at rest and occupying the loading position and the other unit carriers spaced around the central standard, the unit carrier in loading position will have the blow-pipe thereof horizontal.

A workman now inserts a blow-pipe having a gather of glass thereon in the blow-pipe frame and fastens it there by the proper movement of the hand lever to project the bell of the chuck upon one end of the pipe and to cause the rollers to clamp the blow-pipe near the opposite end thereof. This movement will, as before stated, result in a momentary closing of the main switch 27ᶜ upon such carrier and in closing the clutch connecting such carrier with the revolving drum, so that the carrier will move forward. In this movement the blow-pipe frame will be moved about its horizontal trunnion to raise the gather end thereof, which will result in a rolling of the gather along the surface of the marverer, the blow-pipe itself having been put in rotation by the movement of the frame. After this movement of the blow-pipe frame has carried the gather of glass up to or above the upward end of the marverer, the telescopic members of the link 73 will be released and the marverer will swing downwardly away from the marvered blank. As the marverer leaves the blank a puff or puffs of air will be admitted through the air valve and the continued movement of the blow-pipe frame, and so position it that the marvered blank will be upon the lower end of the blow-pipe carried thereby. During this downward swing of the marvered blank the air valve is open as often as may be required to give small puffs of air and as the blow-pipe assumes its vertical position the unit carrier reaches in its movement around the central column what has been designated as the elongation position, where it will be arrested by the opening of the automatic switch 29 by the contact stud 30 adjacent to that position. This stops rotation of the blow-pipe. The parts will remain in this position to permit elongation of the blank depending from the blow-pipe until a circuit through the solenoid is again made. This can be done either by hand or automatically as by the gather controlled element before referred to, and when it occurs, whatever may be the cause of it, the unit carrier again resumes its movement. This movement of the unit carrier brings it in such position that the mold lifting and mold closing cams come into operation to lift and close the mold parts in the order named, they having been previously lowered and opened, and to cause the air valve to be opened by the air cam and the blowing of the glass to take place while in the mold. After this blowing has been accomplished the unit carrier which is still in travel, by such travel causes the mold parts to open, and is then stopped in the position which has been designated the reserve or stopped position, by the automatic switch of such carrier thereof coming in contact with the contact stud for that position. The blow-pipe with the blown article can now be removed from the frame by proper manipulation of the hand lever. The unit carrier remains in this reserve position with the blow-pipe frame thereon vertical until the preceding unit carrier is moved from the loading position. The closing of the main switch on such preceding carrier, through the wire 30ᵃ connecting the studs for the loading and reserve position, also energizes the clutch solenoid of the unit carrier which we are considering and which is in reserve position, thereby causing such unit carrier to move forward to loading position. In this movement the mold, by the proper shaping of the mold lowering cam will be dipped in the water tank to cool, while the blow-pipe frame will be swung by the blow-pipe swinging cam to a horizontal position to receive another iron with a new gather as before described.

Reference has before been made to the fact that the starting of a unit frame from elongation position may be made automatic and dependent upon the action of the gather. The mechanism shown for accomplishing this comprises the two thermostatic contact points 34 so positioned as to be adjacent to the path of the descending gather. As before stated these contact points control the circuit of the relay coil 32 and the heat of the gather when the same by its elongation comes into proximity therewith, causes the points to make contact to energize the clutch magnet. Inasmuch as it is desirable that these points be close to the lower limit of the elongation and close to the line of elongation it is necessary that they be removed from this position before the mold closes. This is accomplished by mounting the contact points upon the outer ends of a crank arm 101ᵃ keyed to the lower end of a vertical shaft 101 carried in a bracket 102 projecting outwardly from each unit carrier, the upper end of the shaft having thereon a finger 101ᵇ, which as the blow-pipe frame swings down to vertical position is struck by a dog 101ᶜ pivoted on the latter, to throw the thermostatic elements carried on the end of the crank arm 101ᵃ adjacent to the path of the gather carried by such arm, this being accomplished against the force of a spring 101ᵈ.

The thermostatic element having acted to close the circuit and thus start the movement of the unit carrier, such movement of the unit carrier is caused to lift the dog 101ᶜ from off the finger 101ᵇ and to thus permit the spring 101ᵈ to remove the thermostatic element away from the gather. This lifting of the dog may be accomplished by the bell crank 104 pivoted on the bracket and connected by the link 105 with a second bell crank 106 pivoted on the unit carrier, which last-named bell crank may be actuated on the movement of a carrier from elongation position, by a stud 108 fast on the central column. The lag in the thermostatic elements is sufficient to maintain the clutch solenoid circuit closed until the unit frame has been moved sufficiently from such elongation position to permit the closing of the automatic switch.

Having thus described my invention, what I claim and desire to secure by Letters Patent is;—

1. In a glass-working machine, the combination with a series of independent units, of means for driving such units in a closed path and with a definite velocity when in motion, means for independently arresting each of such units, and means under the control of the operator for again causing each unit to resume its motion.

2. In a glass-working machine, the combination of a plurality of units, means for moving such units in a closed path, and means for arresting each of said units at each of a plurality of definite positions in such path, means under the control of the operator for causing each unit to move from one of such positions, and automatic means energized thereby for causing the unit at the following position to move therefrom.

3. In a glass-working machine, the combination of a plurality of independent units moving in a closed path, means for independently arresting each of said units to permit elongation of a gather of glass contained thereby, and means actuated by the elongation of such gather to again put the unit in movement.

ORIN A. HANFORD.

Witnesses:
GEORGE H. GILMAN,
J. W. DORSEY.

Copies of this patent may be obtained for five cents each, by addressing the "Commissioner of Patents, Washington, D. C."